US012562046B2

(12) United States Patent
Kim et al.

(10) Patent No.: US 12,562,046 B2
(45) Date of Patent: Feb. 24, 2026

(54) SYSTEM AND METHOD FOR MONITORING LOSS OF FISHING GEAR AND ESTIMATING LOCATION OF LOST FISHING GEAR

(71) Applicant: Gwangju Institute of Science and Technology, Gwangju (KR)

(72) Inventors: Ki Seon Kim, Gwangju (KR); Min Seok Kim, Gwangju (KR); Jin Seong Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 61 days.

(21) Appl. No.: 18/715,714

(22) PCT Filed: Nov. 30, 2022

(86) PCT No.: PCT/KR2022/019184
§ 371 (c)(1),
(2) Date: Jun. 2, 2024

(87) PCT Pub. No.: WO2023/101406
PCT Pub. Date: Jun. 8, 2023

(65) Prior Publication Data
US 2025/0037568 A1     Jan. 30, 2025

(30) Foreign Application Priority Data

Dec. 3, 2021    (KR) ........................ 10-2021-0171732

(51) Int. Cl.
*G08B 21/24*        (2006.01)
*A01K 97/12*        (2006.01)
*B63B 22/00*        (2006.01)

(52) U.S. Cl.
CPC ............ *G08B 21/24* (2013.01); *A01K 97/125* (2013.01); *B63B 22/00* (2013.01); *B63B 2022/006* (2013.01)

(58) Field of Classification Search
CPC ...... G08B 21/24; A01K 97/125; A01K 15/04; B63B 22/00; B63B 2022/006; G06Q 50/02; G06Q 50/10
See application file for complete search history.

(56) References Cited

U.S. PATENT DOCUMENTS

2015/0123786 A1* 5/2015 Hasan .................... G08B 21/24
                                                        340/539.12
2018/0244354 A1* 8/2018 Opshaug .............. A01K 97/125
(Continued)

FOREIGN PATENT DOCUMENTS

KR        10-1858845 B1     5/2018
KR        10-2005311 B1     7/2019
(Continued)

OTHER PUBLICATIONS

Office Action of Japanese Patent Application No. 2024-533266 dated Apr. 15, 2025.
(Continued)

*Primary Examiner* — Brian Wilson
(74) *Attorney, Agent, or Firm* — Revolution IP, PLLC

(57)        ABSTRACT

A fishing gear loss management system includes: fishing gear which is provided underwater, and which provides identification information and location information thereof to the outside; a fishing vessel terminal device, which communicates with the fishing gear and provides fishing vessel information; and a fishing gear loss management device, which performs a management function for the fishing gear or fishing vessel within a preset control area, receives fishing gear location information from the fishing gear and the flow speed and direction of tidal currents from the outside, calculates the flow speed and direction information of the fishing gear on the basis of the received fishing gear location information, and estimates whether the fishing gear is lost and the current location of the lost fishing gear (Continued)

on the basis of the calculated flow speed and direction information and the tidal current flow speed and direction information.

5 Claims, 4 Drawing Sheets

(56)                    References Cited

U.S. PATENT DOCUMENTS

2022/0141553 A1 *    5/2022   Liu ........................ A01K 69/06
                                                            340/850
2022/0161910 A1       5/2022   Kim et al.

FOREIGN PATENT DOCUMENTS

KR      10-2020-0134875  A      12/2020
KR      10-2021-0025346  A       3/2021
KR            10-2296978  B1       9/2021

OTHER PUBLICATIONS

International Search Report of PCT/KR2022/019184 mailed Mar. 7, 2023 from Korean Intellectual Property Office.
Office Action of Korean Patent Application No. 10-2021-0171732 mailed Feb. 1, 2024.

* cited by examiner

500

510
Communication unit

520
Loss determination unit

530
Fishing gear movement estimation unit

540
Memory unit

SYSTEM AND METHOD FOR MONITORING LOSS OF FISHING GEAR AND ESTIMATING LOCATION OF LOST FISHING GEAR

TECHNICAL FIELD

The present invention relates to a system and a method for monitoring loss of fishing gear and estimating the location of the lost fishing gear.

BACKGROUND ART

The content described in this section provides background information about the embodiment only and does not constitute prior art.

In general, fishing gear is a tool used to directly capture or collect objects such as fish underwater. Traditionally, buoys or the global positioning system (GPS) have been utilized to verify the location of the fishing gear installed in a maritime fishing ground.

A buoy is a floating body used as a marking device, also known as a floating mark or a floating tool, and is connected to fishing gear to indicate the location of the fishing gear. Compared with using the GPS, the buoys can indicate at a low cost. However, since a worker must check the location of the fishing gear one by one, it is difficult to obtain location information in real time and to accurately find out location information with the naked eyes.

On the other hand, compared with using the buoys, using the GPS allows for easy verification of the location of the fishing gear at a long distance through GPS modules installed on the fishing gear. However, the above method involves a cost issue due to the use of expensive GPS modules. Particularly, if the fishing gear is lost and sinks below the surface of the water, the GPS module sinks along with the fishing gear, making it impossible to verify the location of the lost fishing gear.

Furthermore, the buoys and GPS modules installed on the conventional fishing gear provide only information about the location of the fishing gear and do not provide other information, such as temperature of tidal current, flow speed, wind speed, and air temperature in an area where the fishing gear is installed. Therefore, there is a limitation in effectively managing the fishing gear installed at sea if the worker does not directly go out to sea.

To address the limitations, recently, buoys equipped with sensors such as a water pressure sensor to monitor water pressure, a tension sensor to monitor the pressure of ropes connected to the fishing gear, and an accelerometer to measure changes in speed of the buoys are provided.

The buoys on which such sensors are installed compare preset values with sensor information to detect the loss and theft of the fishing gear. However, since the buoys having the sensors require an electronic system such as a control circuit to utilize various sensor information, manufacturing costs are increased, and it is realistically difficult to install ropes and tension sensors intended to prevent loss due to the characteristics of the fishing gear that require quick installation. Furthermore, the conventional method using the buoys to detect theft and loss of the fishing gear can frequently trigger theft alarms even when a user of the fishing gear is using the buoys. So, the conventional method requires unnecessary operations such as release of malfunction by the user or a manager, and makes it difficult for the user to make accurate situation determination in case of frequent false alarms related to theft.

DISCLOSURE

Technical Problem

Accordingly, the present invention has been made in view of the above-mentioned problems occurring in the related art, and it is an object of the present invention to provide a system and a method for monitoring loss of fishing gear and estimating how far the fishing gear has moved if lost.

Technical Solution

To accomplish the above-mentioned objects, according to the present invention, there is provided a fishing gear loss management system including: fishing gear which is installed underwater to provide sensing information by using at least one sensor and provide identification information and location information of the fishing gear to the outside; a fishing vessel terminal device, which communicates with the fishing gear to check fishing gear location information thereof and provides fishing vessel information; and a fishing gear loss management device, which performs a management function for the fishing gear or fishing vessels within a preset control area, receives location information of the fishing gear from the fishing gear and the flow speed and direction of tidal currents from the outside, calculates the flow speed and direction information of the fishing gear on the basis of the received fishing gear location information, and estimates whether the fishing gear is lost and the current location of the lost fishing gear on the basis of the calculated flow speed and direction information and the flow speed and direction information of the tidal current.

In one aspect of the present invention, if communication with the fishing gear is disconnected, the fishing gear loss management device determines that the fishing gear is lost.

In one aspect of the present invention, the fishing gear loss management device determines that the fishing gear is lost if the calculated speed of the fishing gear exceeds a predefined threshold.

In one aspect of the present invention, the fishing gear loss management device, when determining that the fishing gear is lost, compares the flow speed and direction information of the fishing gear before a predefined period of time from the fishing gear loss time with the flow speed and direction information of the tidal currents.

In one aspect of the present invention, the fishing gear loss management device, based on the flow direction of the tidal currents at the current time point, estimates the flow direction of the fishing gear at the current time point by reflecting the difference in the flow direction of the fishing gear and the flow direction of the tidal currents before the predefined period of time from the fishing gear loss time.

In one aspect of the present invention, when the flow speed and direction information of the fishing gear and the flow speed and direction information of the tidal currents before the predefined period of time from the fishing gear loss time are all identical, the fishing gear loss management device estimates the flow speed and direction information of the tidal currents at the current time point as the flow speed and direction information of the fishing gear at the current time point.

In one aspect of the present invention, the fishing gear loss management device estimates the location of the fishing gear based on the estimated flow speed and direction of the fishing gear at the current time point.

In one aspect of the present invention, there is provided a method for estimating whether fishing gear is lost and the location of the lost fishing gear by a fishing gear loss management system, including: a receiving step of receiving location information of fishing gear from the fishing gear and flow speed and direction of tidal currents from a marine information survey agency; a calculation step of calculating the flow speed and direction of the fishing gear based on the received location information; a determination step of determining whether the fishing gear is lost; and an estimation step of estimating the location of the fishing gear based on the calculated flow speed and direction information of the fishing gear and the flow speed and direction information of the tidal currents.

In one aspect of the present invention, the calculation step calculates the flow speed and direction of the fishing gear based on the location information of the fishing gear received at different times.

In one aspect of the present invention, the determination step determines whether the fishing gear is lost based on whether communication with the fishing gear is disconnected or whether the flow speed calculated in the calculation step exceeds a predefined threshold.

Advantageous Effect

As described above, the system and the method according to one aspect of the present invention can monitor loss of fishing gear and estimate how far the fishing gear has moved if lost, thereby improving the convenience of managing the fishing gear.

BEST MODE

Figure 1:
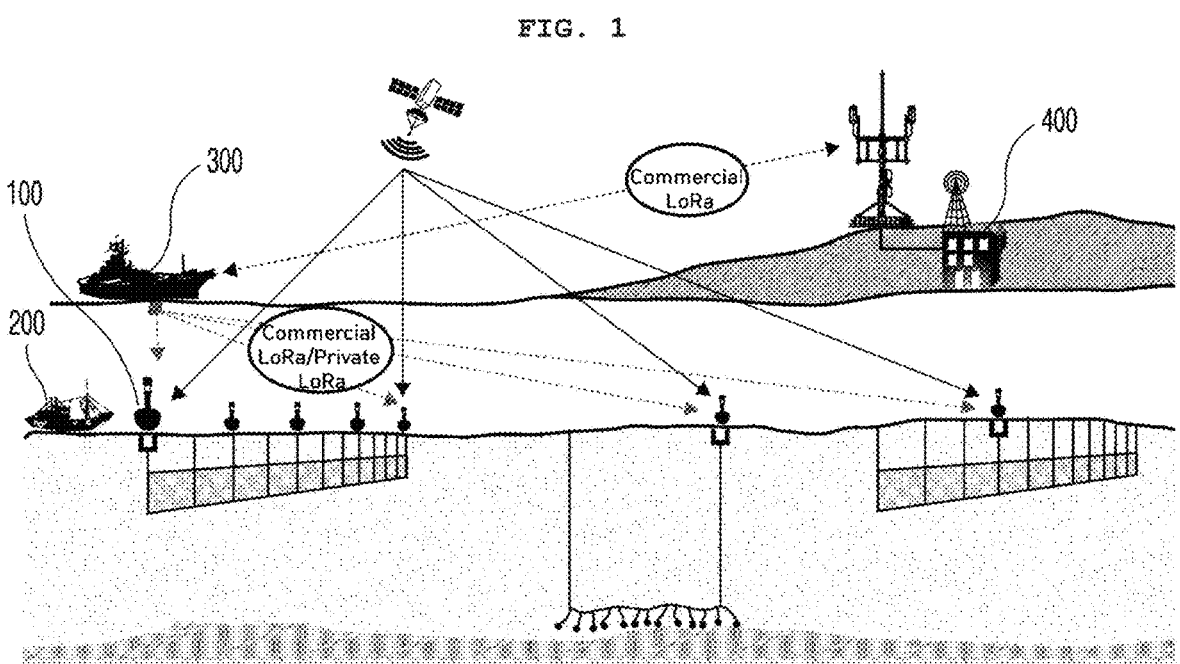
FIG. 1 is a diagram depicting the configuration of fishing gear loss management system according to an embodiment of the present invention.

The example embodiments of the present invention are capable of various modifications and alternative forms, and particular embodiments of the present invention will be illustrated in the attached drawings and described in this specification in detail. It should be understood, however, that there is no intent to limit example embodiments of the invention to the particular forms disclosed, but on the contrary, example embodiments of the invention are to cover all modifications, equivalents, and alternatives falling within the technical idea and scope of the present invention. In the attached drawings, similar components have similar reference numerals even though they are illustrated in different figures. Additionally, in the attached drawings, dimensions of the components are more enlarged than they actually are in order to clarify the present invention.

It will be understood that terms, such as "first", "second", "A", or "B" may be used in the specification to describe various components but are not restricted to the above terms. The terms may be used to discriminate one component from another component. For instance, the first component may be named as the second component, and on the contrary, the second component may be also named as the first component within the scope of the present invention. The term "and/or" includes any and all combinations of one or more of the associated listed items.

It will be understood that when a component is referred to as being "connected" or "coupled" to another component, it can be directly connected or coupled to the other component or intervening components may be present. In contrast, when a component is referred to as being "directly connected" or "directly coupled" to another component, there are no intervening components present.

It will be further understood that the terms used in the present invention are used to describe specific embodiments of the present invention and there is no intent to limit the present invention. The singular form of the components may be understood into the plural form unless otherwise specifically stated in the context. It should be also understood that the terms of 'include' or 'have' in the specification are used to mean that there are characteristics, numbers, steps, operations, components, parts, or combinations of the steps, operations, components and parts described in the specification and there is no intent to exclude existence or possibility of other characteristics, numbers, steps, operations, components, parts, or combinations of the steps, operations, components and parts.

Unless otherwise defined, it will be understood that all terms used in the specification including technical or scientific terms has the same meanings as to be generally or commonly understood by those of ordinary skill in the art.

It will be further understood that terms described as the meaning defined in commonly used dictionaries shall be interpreted as having meanings that are consistent with their meanings in the context of the relevant art and the technical idea of the invention, and shall not be interpreted as having ideal meanings or excessively formal meanings, not otherwise particularly stated.

Additionally, each component, process, step, or method included in each embodiment of the present invention can be shared within a technically non-contradictory scope.

Figure 2:
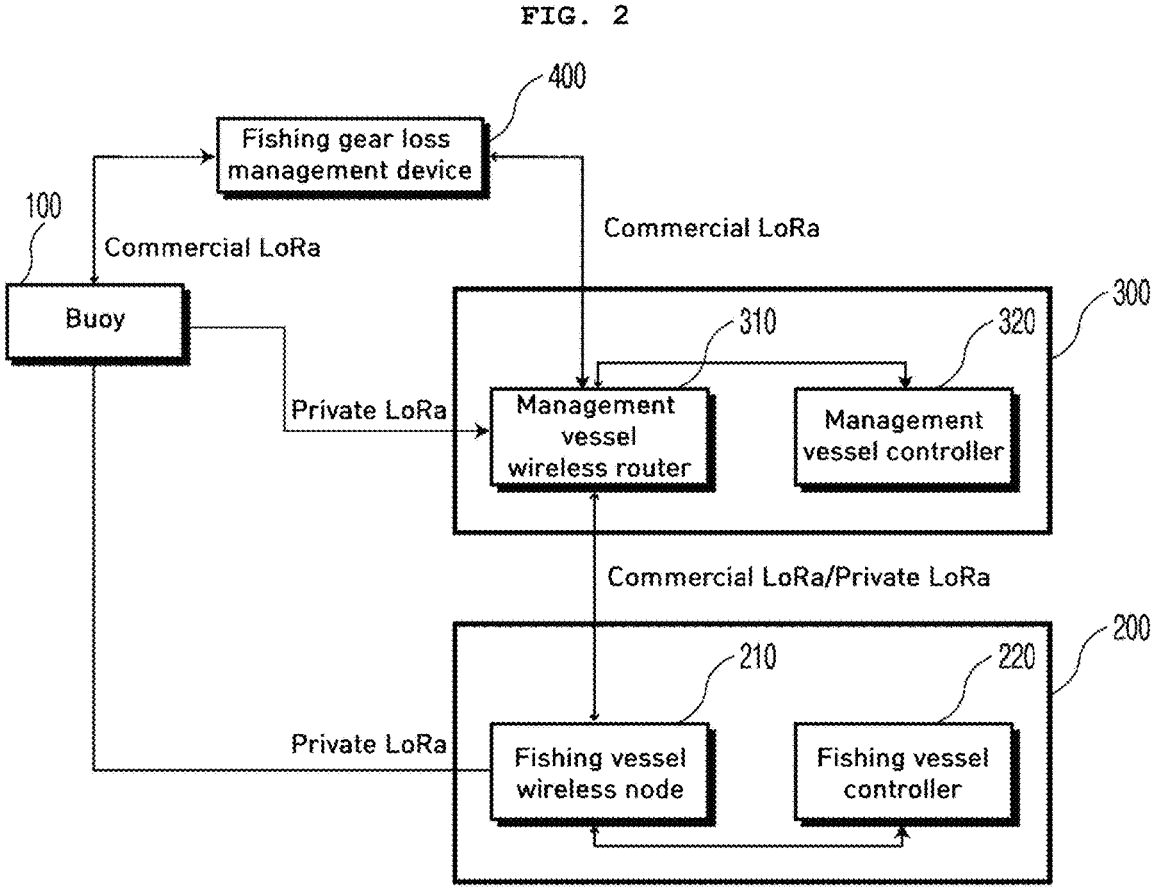
FIG. 2 is a block diagram depicting the configuration of the fishing gear loss management system according to the embodiment of the present invention.

FIG. 1 is a diagram depicting the configuration of fishing gear loss management system according to an embodiment of the present invention, and FIG. 2 is a block diagram depicting the configuration of the fishing gear loss management system according to the embodiment of the present invention.

Referring to FIGS. 1 and 2, the fishing tool loss monitoring system includes buoys 100, a fishing vessel terminal device 200, a management vessel terminal device 300, and a fishing gear loss management device 400.

The buoys 100 are detachably installed at predetermined intervals on each piece of fishing gear such as gill nets and provides sensing information using at least one sensor, and provides identification information and location information thereof. The buoys can include various sensors such as temperature sensors, acceleration sensors, water detection sensors, and acoustic sensors.

The fishing vessel terminal device 200 registers its fishing gear identification information with at least one buoy 100, communicates with the buoy 100 to check the buoy location information, and provides vessel information including fishing vessel identification information, fishing vessel location information, fishing gear identification information, and buoy location information thereof.

The management vessel terminal device 300, when receiving buoy or fishing gear loss information from the fishing gear loss management device 400, can perform operation to recover lost fishing gear using fishing gear scanning. The management vessel terminal device 300 performs functions such as fishing guidance or fishing check, and must be aware of the location information of fishing vessels and location information of buoys that the management vessel terminal device manages.

The fishing gear loss management device 400 performs management functions for the fishing gear or the fishing vessels within a predefined jurisdiction area, and transmits and receives information using a communication network with the fishing vessel terminal device 200 and the buoy 100. Moreover, the fishing gear loss management device 400 monitors for theft or loss of the buoy 100 or the fishing gear, and when loss is detected, estimates the path of loss and informs the fishing vessel terminal device 200 or the management vessel terminal device 300. Accordingly, the fishing vessel terminal or management vessel terminal can more easily recover the lost fishing gear.

The fishing gear loss management device 400 receives integrated information, such as information operated by an intelligent navigation system (INS), an integrated maritime information technology (IMIT), a marine environment information system (MEIS) in a fishing vessel controller 220 or a management vessel controller 320, through the communication network, allowing for real-time monitoring of the current state of the vessel.

The fishing gear loss management device 400 identifies the location of at least one piece of fishing gear and at least one buoy on land, communicates with the management vessel terminal device 300 or the fishing vessel terminal device 200 to provide weather and marine state information to the vessel through remote monitoring between land, management vessels, and fishing vessels, and then receives integrated information of the vessel to enable real-time monitoring and control of the vessel from land. Specifically, the fishing gear loss management device displays the vessel's state received through wireless communication (satellite, wireless communication modem, etc.) to the vessel, and transmits MEIS weather information and control commands to the vessel.

The fishing gear loss management device 400 communicates with the buoy 100 or the fishing gear to determine the locations of the buoy or the fishing gear. Based on the location information transmitted from the buoy 100 or the fishing gear, the fishing gear loss management device 400 assesses the flow speed and direction of the fishing gear, and thus can determine whether the fishing gear has been lost. Additionally, the fishing gear loss management device 400 receives information about the flow speed and direction of tidal currents in an area where the fishing gear is located from marine information survey institutions such as the National Marine Survey Agency. Based on the flow speed and direction of the fishing gear and the flow speed and direction of tidal currents, the fishing gear loss management device 400 estimates how far and in what direction the lost fishing gear might have moved. The fishing gear loss management device 400 transmits the estimated results to the management vessel terminal device 300 or the fishing vessel terminal device 200, thereby enabling the management vessel or fishing vessel to recover the fishing gear. The specific configuration of the fishing gear loss management device 400 will be described later with reference to FIG. 5.

Meanwhile, the fishing vessel terminal device 200 includes a fishing vessel wireless node 210 and a fishing vessel controller 220, and the management vessel terminal device 300 includes a management vessel wireless router 310 and a management vessel controller 320. The fishing vessel wireless node 210 serves as a LoRa-based gateway, and is connected to a plurality of buoys 100 located within a predefined radius (10 Km) from the fishing vessel to exchange information. Additionally, the management vessel wireless router 310 acts as a LoRa-based wireless relay communication gateway with the buoy 100, the fishing vessel terminal device 200, and the fishing gear loss management device 400.

Furthermore, the fishing vessel controller 220 and the management vessel controller 320 can be generally server-type computer bodies or various other devices capable of performing server functions. Specifically, the fishing vessel controller 220 and the management vessel controller 320 can be implemented in computing devices that include a communication module (not illustrated), a memory (not illustrated), a processor (not illustrated), and a database (not illustrated).

Figure 3:
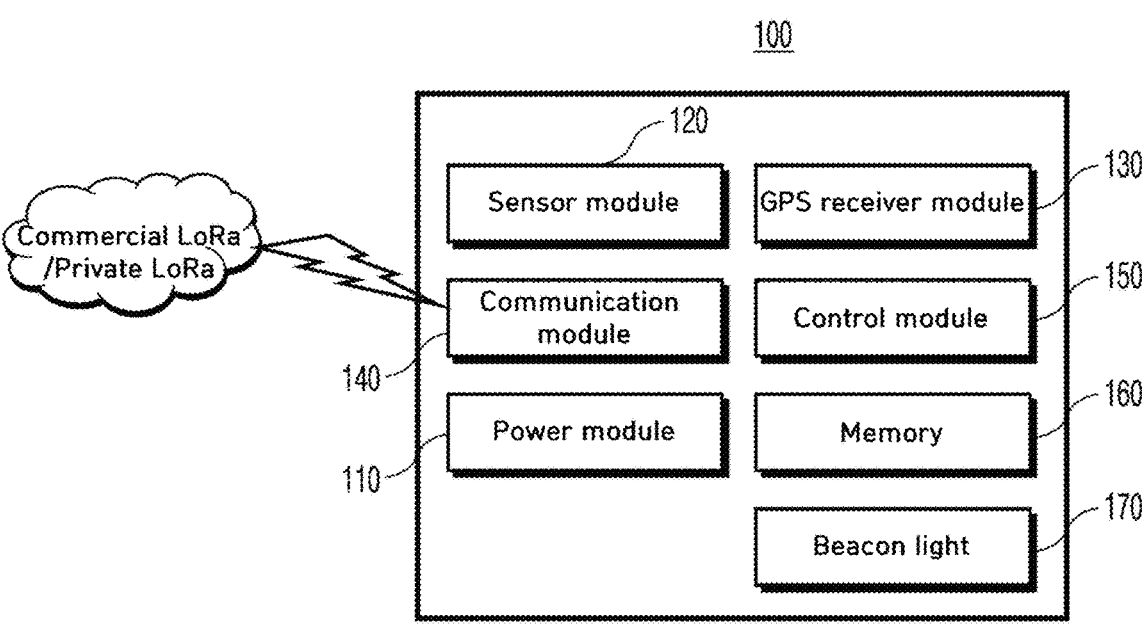
FIG. 3 is a diagram depicting the configuration of a buoy according to the embodiment of the present invention.

FIG. 3 is a diagram depicting the configuration of the buoy according to the embodiment of the present invention.

The buoy 100 includes a power module 110, a sensor module 120, a GPS receiver module 130, a communication module 140, and a control module 150, but is not limited thereto.

The power module 110 provides power necessary for the operation of the buoy 100. The power module 110 can report the battery charge state to the fishing vessel terminal device 200 or the management vessel terminal device 300 through the communication module 140.

The sensor module 120 includes at least one of a temperature sensor, an acceleration sensor, and an acoustic sensor, and provides sensor information detected by the sensor.

The GPS receiver module 130 provides current buoy location information using GPS signals received from a GPS satellite. The GPS receiver module 130 can receive signals from a global navigation satellite system (GNSS) and a satellite based augmentation system (SBAS) to provide highly accurate location information.

The communication module 140 can selectively use commercial LoRa and private LoRa depending on the radio conditions to communicate with the fishing vessel terminal device 200, the management vessel terminal device 300, and the fishing gear loss management device 400. The communication module 140 can connect the fishing vessel wireless node 210 or the management vessel wireless router 310 to a LoRa-based communication network.

A beacon light 170 can serve as a warning light that visually indicates the location of the buoy in the dark or at night.

The control module 150 controls the overall operations within the buoy 100 using various programs stored in the memory 160. The memory 160 stores not only the programs controlling the operations of the buoy but also identification information and control information of the buoy 100.

Figure 4:
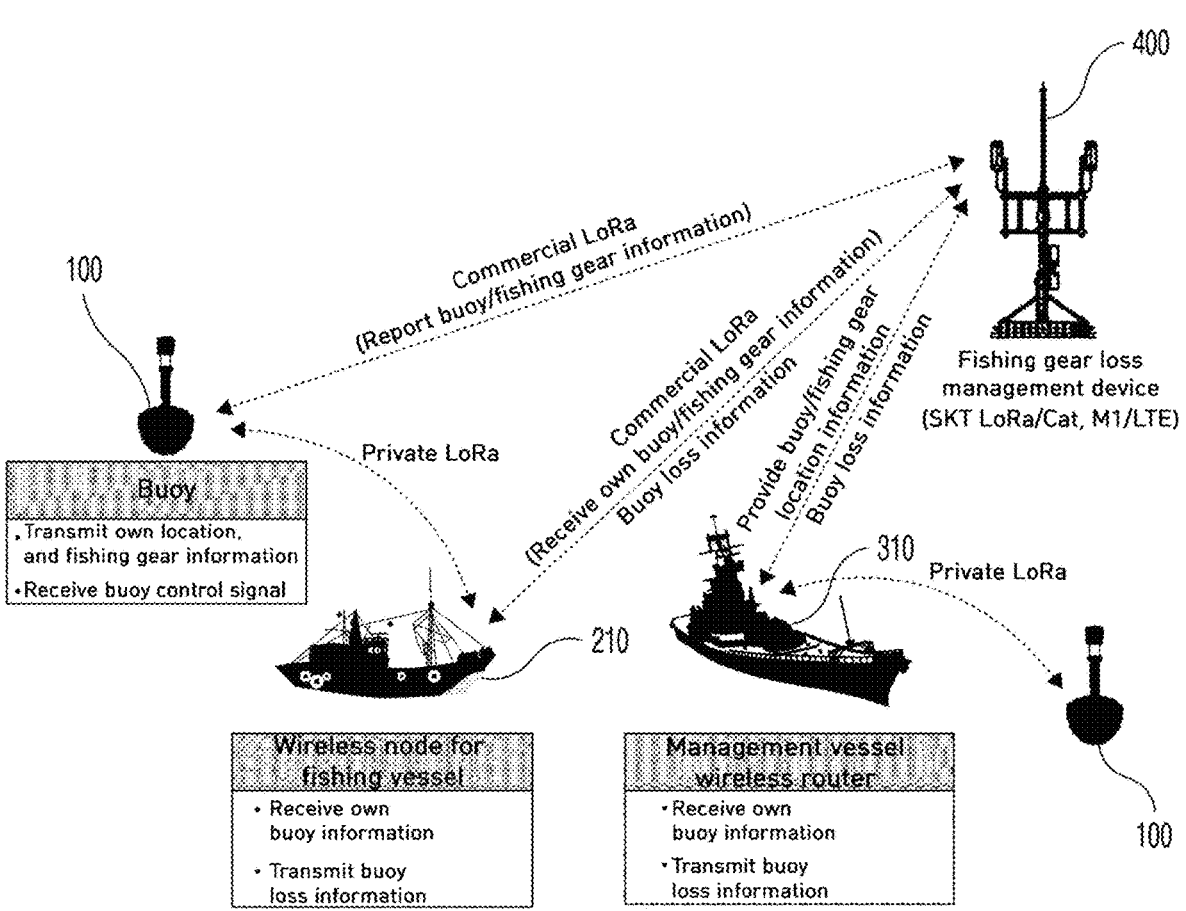
FIG. 4 is a diagram depicting a process of providing communication services in a signal shadow area of the fishing gear loss management system according to the embodiment of the present invention.

FIG. 4 is a diagram depicting a process of providing communication services in a signal shadow area of the fishing gear loss management system according to the embodiment of the present invention.

Referring to FIG. 4, the buoy 100, the fishing vessel terminal device 200, the management vessel terminal device 300, and the fishing gear loss management device 400 form LoRa-based communication channels for low-power long-range communication.

In this instance, the fishing gear loss management device 400 forms a main communication channel through the public LoRa (Low Power Wide Area) network with the buoy 100, the fishing vessel terminal device 200, and the management vessel terminal device 300. Therefore, the fishing gear loss management device 400 can receive the location of the buoy and fishing gear information from the buoy 100 through the main communication channel, and can send buoy control signals to each buoy 100. Additionally, the fishing gear loss management device 400 can receive buoy location information and fishing gear information from the fishing vessel wireless node 210 through the main communication channel, and can transmit the loss information of the buoy or the fishing gear. The fishing gear loss management device 400 can transmit and receive all buoy and fishing gear information, as well as loss information of the buoy or the fishing gear, within the management area of the management vessel using the management vessel wireless router 310. Thus, the terminal device 320 of the management vessel can be notified of the results (such as loss information of the buoy or the fishing gear) determined by the fishing gear loss management device 400 through commercial LTE (CAT. M1).

However, the buoy 100, the fishing vessel wireless node 210, and the management vessel wireless router 310 disconnect the communication link of the main communication channel through the commercial LoRa network in signal shadow areas, and form a sub-communication channel through a private LoRa network to transmit and receive information.

The buoy 100, the fishing vessel terminal device 200, and the management vessel terminal device 300 assess the communication status through positive/negative response signals (Ack/Nck) to traffic requests. If the communication status is good, information is transmitted and received through the main communication channel. However, if a positive response (Ack) signal is not received during predetermined acknowledgment time through the main communication channel, it is determined that there is a communication disconnection on the main channel, and a sub-communication channel through the private LoRa network is formed.

As described above, the buoy 100, the fishing vessel terminal device 200, and the management vessel terminal device 300 can ensure communication speed and connectivity by selectively connecting to the commercial LoRa network and the private LoRa network depending on the radio conditions.

Figure 5:
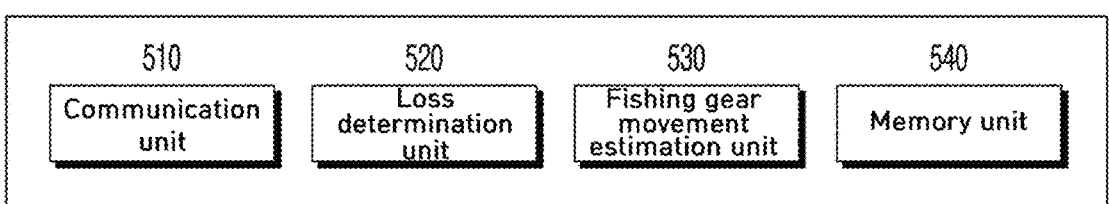
FIG. 5 is a block diagram depicting the configuration of a fishing gear loss management device according to the embodiment of the present invention.

FIG. 5 is a block diagram depicting the configuration of a fishing gear loss management device according to the embodiment of the present invention.

Referring to FIG. 5, the fishing gear loss management device 400 according to an embodiment of the present invention includes a communication unit 510, a loss determination unit 520, a fishing gear movement estimation unit 530, and a memory unit 540.

The communication unit 510 performs wireless communication with the outside based on LoRa or other protocols and transmits and receives necessary information.

The communication unit 510 performs wireless communication based on other protocols to receive necessary information from external marine information survey agencies. The communication unit 510 can communicate with the meteorological agency to receive weather information. Meanwhile, the communication unit 510 can receive information on the flow speed and direction of tidal currents from marine information survey agencies such as the National Marine Survey Agency. The communication unit 510 can receive information from external marine information survey agencies at predefined intervals (for example, every few minutes).

The communication unit 510 performs LoRa-based wireless communication and transmits received meteorological information to the fishing vessel terminal device 200 or the management vessel terminal device 300.

The communication unit 510 also performs LoRa-based wireless communication and receives the current location (coordinates) of the buoy from the buoy 100. The communication unit 510 receives the location of the buoy from the buoy 100 at predefined intervals. For example, the predefined interval may be every few minutes, and the communication unit 510 can receive the location of the buoy from the buoy 100 at the predefined intervals.

The loss determination unit 520 determines whether the buoy 100 or the fishing gear is lost based on the coordinates received from the buoy 100 or the communication status with the buoy 100. The loss determination unit 520 can calculate the velocity (flow speed and direction) of the buoy from the coordinates of the buoy using the following equation:

$$\phi_1 = lat_1 \times \frac{\pi}{180}$$

$$\phi_2 = lat_2 \times \frac{\pi}{180}$$

$$\lambda_1 = lon_1 \times \frac{\pi}{180}$$

$$\lambda_2 = lon_2 \times \frac{\pi}{180}$$

$$x = \cos(\phi_1) \times \sin(\phi_2) - \sin(\phi_1) \times \cos(\phi_2) \times \cos(\lambda_2 - \lambda_1)$$

$$y = \sin(\lambda_2 - \lambda_1) \times \cos(\phi_2)$$

$$\theta = a\tan 2(y, x).$$

Herein, $\phi_1$ and $\phi_2$ represent the longitude at a first time point and a second time point, respectively, and $\lambda_1$ and $\lambda_2$ represent the latitude at the first time point and the second time point, respectively. The coordinates (x,y, $\ominus$) of the buoy at each time point are derived from the latitude and longitude, and the flow speed and direction can be determined based on the change in coordinates and the change rate per unit of time.

If communication with buoy 100 is interrupted or if the calculated velocity of the buoy 100 through the above process exceeds a predetermined threshold, the loss determination unit 520 determines that the buoy 100 is lost.

The fishing gear movement estimation unit 530 estimates the location of the fishing gear by comparing the flow speed and direction of the fishing gear and the flow speed and direction of the tidal currents prior to loss. The fishing gear movement estimation unit 530 compares the flow speed and direction of the fishing gear before a predefined period of time from the time that the fishing gear was determined to be lost with the flow speed and direction of the tidal currents at the same time point. Here, the predefined period can be set based on the interval at which the flow speed and direction of the tidal currents change. Currents do not continuously change flow speed and direction, but maintain the same values for a predetermined period of time and then change the values. For example, tidal currents typically change the flow speed and direction per unit time based on the high and low tides over a six-hour period. Referring to the characteristics of tidal currents, the fishing gear movement estimation unit 530 compares the data (flow speed and direction) of the fishing gear and the data (flow speed and direction) of the tidal currents before the predefined period of time from the time that the fishing gear was lost.

The fishing gear movement estimation unit 530 compares the flow direction of the fishing gear with the flow direction of the tidal currents at the corresponding time point to estimate the flow direction of the fishing gear at the current time point. Unlike the flow speed, the flow direction of the fishing gear generally moves in alignment with the flow direction of the tidal currents. Therefore, the fishing gear movement estimation unit 530 calculates the difference between the flow direction of the fishing gear and the flow direction of the tidal current before the predefined period from the time that it was determined that the fishing gear was lost. The fishing gear movement estimation unit 530 estimates the flow direction of the tidal currents at the current time point by reflecting the difference in flow direction calculated based on the flow direction of the tidal currents at the current time point. For instance, if there was no difference between the flow direction of the fishing gear and the flow direction of the tidal current at the corresponding time point, the fishing gear movement estimation unit 530 estimates that the flow direction of the tidal currents at the current time point is the flow direction of the fishing gear. Conversely, if the flow direction of the fishing gear at the corresponding time point differed by 45 degrees clockwise from the flow direction of the tidal currents, the fishing gear movement estimation unit 530 estimates that the flow direction of the fishing gear at the current time point has a difference of 45 degrees clockwise relative to the flow direction of the tidal currents.

Similarly, the fishing gear movement estimation unit 530 compares the flow speed of the fishing gear with the flow speed of the tidal currents at the corresponding time point to estimate the flow speed of the fishing gear at the current time point. If the flow speed of the fishing gear with the flow speed of the tidal current were the same at the predefined time point, the fishing gear movement estimation unit 530 estimates the flow speed of the tidal currents as the flow speed of the fishing gear. However, if the flow speed of the fishing gear and the flow speed of the tidal currents were different at the predefined time point, the flow speed of the fishing gear at the current time point is estimated using the following equation based on the water depth information, the flow speed of the tidal currents, and the ratio of the flow speed of the tidal currents to the flow speed of the fishing gear:

$$\hat{v}(t) = n \times v_c(t, z)$$

$$v_c(t, z) = v_c^b(t) + \left[ \left( v_c^s(t) - v_c^b(t) \right) \frac{z - z_b}{z_s - z_b} \right]^{\frac{1}{p}}.$$

Herein, n is the ratio of the flow speed of the fishing gear to the flow speed of the tidal currents at a predefined time point, $v_c(t,z)$ represents the flow speed of the tidal currents at depth of z meters at the current time point, $v_c^b(t)$ represents the flow speed of the tidal currents at the seabed, $v_c^s(t)$ represents the flow speed of the tidal currents the tide surface, z is the depth of the fishing gear at the predefined time point, $z_s$ is the depth of the seabed when there are no waves, $z_b$ is the depth of the seabed when there are waves, and p represents the behavior coefficient of the fishing gear. Information other than n and p can be obtained from marine information survey agencies such as the National Marine Survey Agency. The present invention inferred changes in flow speed at the seabed according to the depth using the exponential law to calculate the flow speed of the tidal currents according to different depths above the seabed, and calculated the location of the lost fishing gear using the flow speed. In this instance, the exponential coefficient (p) is numerical values previously determined in consideration of various conditions, and varies between $\frac{1}{4}$ and $\frac{1}{12}$, and n is determined at the predefined time point. According to the equation, the flow speed of the fishing gear at the current time point is estimated.

The fishing gear movement estimation unit 530 estimates the location of the fishing gear at the current time point based on the estimated flow direction and rate of the fishing gear. Since the flow speed and direction of the fishing gear are determined, the fishing gear movement estimation unit can calculate how far and in which direction the fishing gear has moved at the current time point. Accordingly, the fishing gear movement estimation unit 530 can estimate the current location of the fishing gear.

The memory unit 540 stores information received from the buoy 100 at predetermined intervals and information received from the marine information survey agencies at predetermined intervals by the communication unit 510. Since storing the information, the memory unit 540 supports the determination of the loss determination unit 520 and the estimation of the fishing gear movement estimation unit 530.

Figure 6:
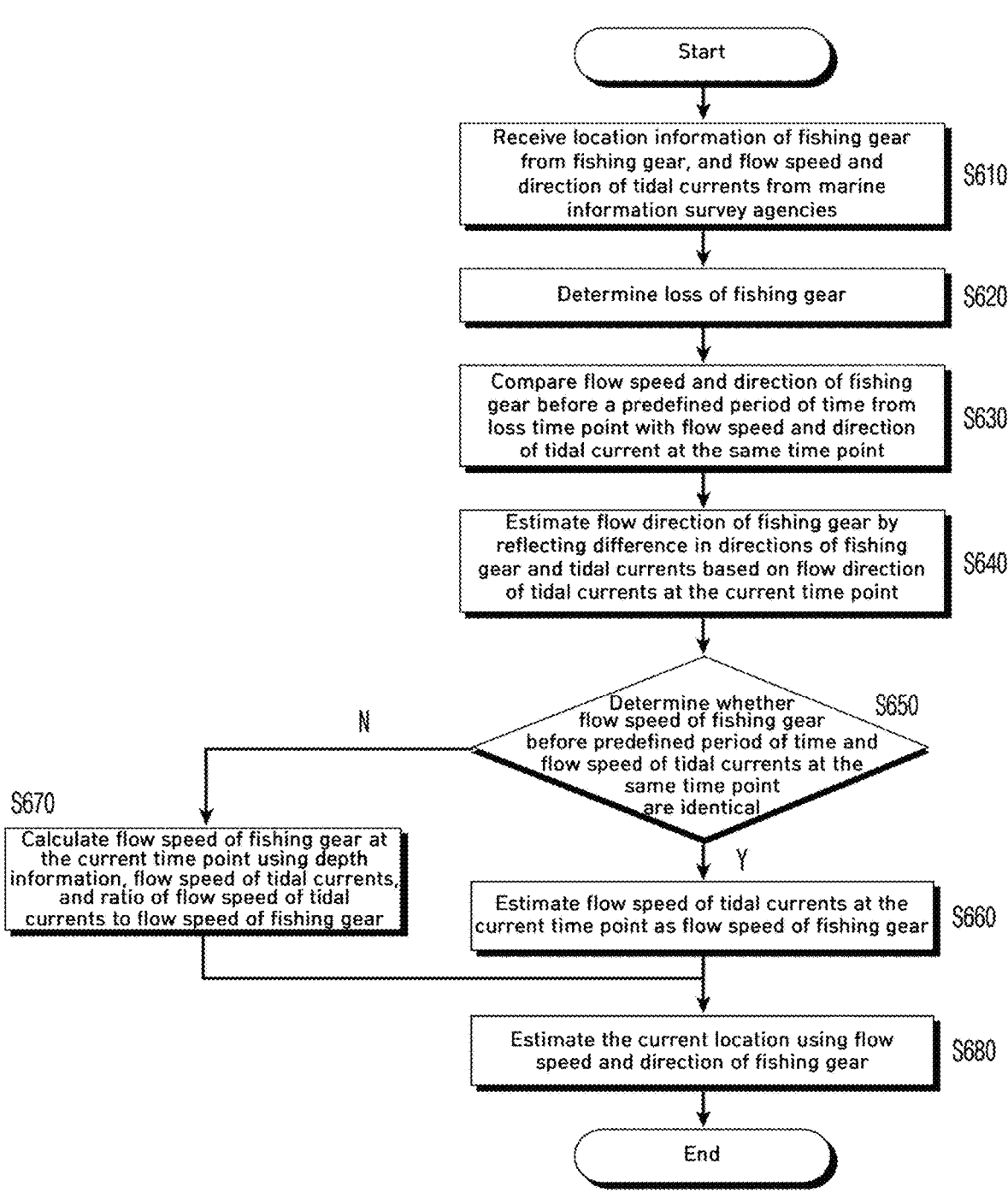
FIG. 6 is a flowchart illustrating a method of monitoring the loss of the fishing gear and estimating the movement of the fishing gear by a fishing gear loss management device according to the embodiment of the present invention.

FIG. 6 is a flowchart illustrating a method of monitoring the loss of the fishing gear and estimating the movement of the fishing gear by a fishing gear loss management device according to the embodiment of the present invention.

The communication unit 510 receives location information of the fishing gear from the fishing gear and the flow speed and direction of the tidal currents in the region where the fishing gear is located from marine information survey agencies (S610).

The loss determination unit 520 determines whether the fishing gear is lost (S620). The loss determination unit 520 calculates the flow speed and direction of the fishing gear based on the location information of the fishing gear. The loss determination unit 520 determines whether the fishing gear is lost based on whether communication with the fishing gear is disconnected or whether the flow speed of the fishing gear exceeds a predetermined threshold.

The fishing gear movement estimation unit 530 compares the flow speed and direction of the fishing gear before the predefined period of time from the loss time point with the flow speed and direction of the tidal currents at the same time point (S630).

The fishing gear movement estimation unit 530 estimates the flow direction of the fishing gear by reflecting the difference in the directions of the fishing gear and the tidal currents based on the flow direction of the tidal currents at the current time point (S640).

The fishing gear movement estimation unit 530 determines whether the flow speed of the fishing gear before the predefined period of time and the flow speed of the tidal currents at the same time point are identical (S650).

If the flow speed of the fishing gear before the predefined period of time and the flow speed of the tidal currents at the same time point are identical, the fishing gear movement estimation unit 530 estimates the flow speed of the tidal currents as the flow speed of the fishing gear (S660).

If they differ, the fishing gear movement estimation unit 530 calculates the flow speed of the fishing gear using depth information, the flow speed of the tidal currents, and the ratio of the flow speed of the tidal currents to the flow speed of the fishing gear (S670).

The fishing gear movement estimation unit 530 estimates the current location of the fishing gear using the flow speed and direction of the fishing gear (S680).

As described above, while the present invention has been particularly illustrated and described with reference to the example embodiments thereof, it will be understood by those of ordinary skill in the art that the above embodiments of the present invention are all exemplified and various changes, modifications and equivalents may be made therein without changing the essential characteristics and scope of the present invention. Therefore, it would be understood that the embodiments disclosed in the present invention are not to limit the technical idea of the present invention but to describe the present invention, and the technical and protective scope of the present invention shall be defined by the illustrated embodiments. It should be also understood that the protective scope of the present invention is interpreted by the following claims and all technical ideas within the equivalent scope belong to the technical scope of the present invention.

MODE FOR INVENTION

The mode for carrying out the invention has been described together with the best mode for carrying out the invention.

INDUSTRIAL APPLICABILITY

The present invention relates to a system and a method for monitoring loss of fishing gear and estimating the location of the lost fishing gear, and is industrially applicable as being variably utilized when monitoring whether fishing gear is lost.

The invention claimed is:

1. A fishing gear loss management system comprising:
fishing gear which is installed underwater to provide sensing information by using at least one sensor and provide identification information and location information of the fishing gear to the outside;
a fishing vessel terminal device, which communicates with the fishing gear to check fishing gear location information thereof and provides fishing vessel information; and a fishing gear loss management device, which performs a management function for the fishing gear or fishing vessels within a preset control area, receives the location information of the fishing gear from the fishing gear and a flow speed and direction of tidal currents from the outside, calculates the flow speed and direction information of the fishing gear on the basis of the received fishing gear location information, and estimates whether the fishing gear is lost and the current location of the lost fishing gear on the basis of the calculated flow speed and direction information and the flow speed and direction information of the tidal currents,
wherein the fishing gear loss management device, when determining that the fishing gear is lost, compares the flow speed and direction information of the fishing gear before a predefined period of time from the fishing gear loss time with the flow speed and direction information of the tidal currents, and
wherein the fishing gear loss management device, based on the flow direction of the tidal currents at the current time point, estimates the flow direction of the fishing gear at the current time point by reflecting the difference in the flow direction of the fishing gear and the flow direction of the tidal currents before the predefined period of time from the fishing gear loss time.

2. The fishing gear loss management system according to claim 1, wherein, if communication with the fishing gear is disconnected, the fishing gear loss management device determines that the fishing gear is lost.

3. The fishing gear loss management system according to claim 1, wherein the fishing gear loss management device determines that the fishing gear is lost if the calculated speed of the fishing gear exceeds a predefined threshold.

4. A fishing gear loss management system comprising:
fishing gear which is installed underwater to provide sensing information by using at least one sensor and provide identification information and location information of the fishing gear to the outside;
a fishing vessel terminal device, which communicates with the fishing gear to check fishing gear location information thereof and provides fishing vessel information; and
a fishing gear loss management device, which performs a management function for the fishing gear or fishing vessels within a preset control area, receives the location information of the fishing gear from the fishing gear and a flow speed and direction of tidal currents from the outside, calculates the flow speed and direction information of the fishing gear on the basis of the received fishing gear location information, and estimates whether the fishing gear is lost and the current location of the lost fishing gear on the basis of the calculated flow speed and direction information and the flow speed and direction information of the tidal currents,
wherein the fishing gear loss management device, when determining that the fishing gear is lost, compares the flow speed and direction information of the fishing gear before a predefined period of time from the fishing gear loss time with the flow speed and direction information of the tidal currents, and
wherein when the flow speed and direction information of the fishing gear and the flow speed and direction information of the tidal currents before the predefined period of time from the fishing gear loss time are all identical, the fishing gear loss management device estimates the flow speed and direction information of the tidal currents at the current time point as the flow speed and direction information of the fishing gear at the current time point.

5. The fishing gear loss management system according to claim 4, wherein the fishing gear loss management device estimates the location of the fishing gear based on the estimated flow speed and direction of the fishing gear at the current time point.

\* \* \* \* \*